United States Patent [19]

Wolf et al.

[11] Patent Number: 5,611,007
[45] Date of Patent: Mar. 11, 1997

[54] ASYMMETRIC INTEGRATED OPTICAL MACH-ZEHNDER INTERFEROMETER

[75] Inventors: Barbara Wolf, Kronau; Norbert Fabricius, Hockenheim, both of Germany

[73] Assignee: IOT Integrierte Optil GmbH, Jena, Germany

[21] Appl. No.: 510,845

[22] Filed: Aug. 3, 1995

[30] Foreign Application Priority Data

Aug. 3, 1994 [DE] Germany ............................ 44 27 523.4

[51] Int. Cl.⁶ ................................................................ G02B 6/12
[52] U.S. Cl. ................................. 385/14; 385/45; 385/11; 385/31; 385/24
[58] Field of Search ................................. 385/14, 11, 15, 385/16, 24, 31, 45, 132

[56] References Cited

U.S. PATENT DOCUMENTS

| | | | |
|---|---|---|---|
| 4,266,850 | 5/1981 | Burns | 350/96.14 |
| 4,515,430 | 5/1985 | Johnson | 350/96.13 |
| 4,674,827 | 6/1987 | Izutsu et al. | 350/96.12 |
| 5,035,734 | 7/1991 | Honkanen et al. | 65/30.13 |
| 5,078,516 | 1/1992 | Kapon et al. | 385/129 |
| 5,119,447 | 6/1992 | Trisno | 385/3 |
| 5,418,868 | 5/1995 | Cohen et al. | 385/14 X |

FOREIGN PATENT DOCUMENTS

| | | |
|---|---|---|
| 0482461 | 4/1992 | European Pat. Off. . |
| 3107112 | 9/1982 | Germany . |
| 62-160405 | 7/1987 | Japan . |

OTHER PUBLICATIONS

"Channel waveguide Mach–Zehnder interferometer for wavelength splitting and combining" by A. Tervonen et al, Conference of Microoptics, ECO, Mar. 1991.

Primary Examiner—Phan T. H. Palmer
Attorney, Agent, or Firm—Walter Ottesen

[57] ABSTRACT

An integrated optical Mach-Zehnder interferometer has two arms (11, 12) having different geometric path lengths. A first arm 11 includes arcuate segments (113, 114, 115, 116) and linear segments (111, 112) and the second arm 12 includes a mirror image arcuate segment (123, 124, 125, 126) for each arcuate segment of the first arm 11 and the total length of the straight segments (121) of the second arm 12 is less than the total length of the straight segments (111, 112) of the first arm 11. The integrated optical Mach-Zehnder interferometer is used as a demultiplexer with a 2×2 coupler at the output and as a multiplexer with a reversed beam path. The phase difference of both arms is directly proportional to the difference of the geometric path lengths.

11 Claims, 2 Drawing Sheets

1

ASYMMETRIC INTEGRATED OPTICAL MACH-ZEHNDER INTERFEROMETER

FIELD OF THE INVENTION

The invention relates to an integrated optical Mach-Zehnder interferometer having two arms of different geometric path lengths.

BACKGROUND OF THE INVENTION

A demultiplexer having a Mach-Zehnder interferometer of this kind is disclosed in European patent publication 0,482,461. The configuration of the two arms is defined only by the influence thereof on the wavelength-dependent or polarization-dependent optical path difference. Various possibilities with Y-branching devices or contactless couplers are presented with respect to possible embodiments of the branching device at the input and with respect to the 2×2 coupler at the output.

The difference of the optical path length in curved waveguides compared to straight waveguides in connection with an arrangement according to that disclosed in the above-mentioned European patent publication 0,482,461 is described in the paper of A. Tervonen et al, "Channel waveguide Mach-Zehnder interferometer for wavelength splitting and combining", Conference on Microoptics ECO, Hague, March 1991.

U.S. Pat. No. 4,515,430 shows (FIG. 2) and describes a Mach-Zehnder interferometer having a Y-branch at the input and two Y-branches at the output with two output waveguides. This arrangement is, however, a sensor, for example, for temperature. One arm is connected at both ends via narrow S-curves to the couplers and between the couplers, the other arm follows a large arc. The influence of bends on the optical path length is not described. Instead, the attenuation losses are minimized because of the configuration of the two arms.

SUMMARY OF THE INVENTION

It is an object of the invention to configure a Mach-Zehnder interferometer so that the optical path difference of the two arms is defined by the difference of the geometric path lengths in a simple defined manner.

Advantageous embodiments and applications are provided especially with respect to demultiplexers or multiplexers.

The integrated optical Mach-Zehnder interferometer of the invention includes: first and second waveguide arms; the first waveguide arm including a first plurality of arcuate segments and a plurality of straight segments; the second waveguide arm including a second plurality of arcuate segments and at least one straight segment; each of the arcuate segments of the second plurality being a mirror image of a corresponding one of the arcuate segments of the first plurality of arcuate segments; and, the straight segment of the second waveguide arm having a length less than the total length of the straight segments of the first waveguide arm.

The invention is based on the realization that the propagation constant or the effective refractive index of a bent waveguide is dependent upon the radius so that the optical path length in the arc is not only proportional on the arc length but also dependent upon the radius. According to a feature of the invention, the same arcuate segments which are mirror images of each other are provided in the two arms, respectively, of the Mach-Zehnder interferometer. Because of this feature, the above-mentioned effect is eliminated from the total optical path length difference.

The arcuate segments are mirror images with the same radius and the same angle and therefore with the same arc length, but with mutually opposite directions of curvature. However, the arc segments do not necessarily have to be arranged mirror symmetrical to a specific plane.

Optical and geometric path length differences are proportional for the straight segments.

As a side effect, the curvature losses are made symmetrical. These losses are those which occur in the form of emitted radiation when passing through the curves. The remaining component of the overall curvature losses are the transition losses which occur when passing from straight segments to arcuate segments or when changing the direction of curvature in which case the losses are even greater.

This remaining component can, however, be considerably reduced by suitably selecting offsets between the waveguides. Thus, a lateral offset for reducing the attenuation can be provided at at least one junction between waveguide segments of different curvature.

An especially advantageous multiplexer is provided with a Mach-Zehnder interferometer as described above when a cross coupler of the type having two Y-branches in cascade is arranged at the output or if a contactless 2×2 coupler is arranged at the output with this last embodiment being preferably asymmetrical.

The above-mentioned 2×2 coupler is asymmetrical and corresponds to that disclosed in U.S. Pat. No. 5,526,453 and incorporated herein by reference.

Advantageous forms of the two arms are provided when the first arm includes two straight segments and the second arm includes one straight segment. Another advantageous embodiment is provided when the Mach-Zehnder interferometer is configured so as to be symmetrical to a plane perpendicular to the direction of the inlet waveguide provided the couplers or branches at the inlet and outlet are compatible.

Another advantageous form of the two arms is provided when a lateral offset for reducing the attenuation is provided at at least one junction between waveguide segments of different curvature. In this connection, reference can be made to German Patent 3,107,112 and to U.S. patent application Ser. No. 08/441,463, filed May 15, 1995, and incorporated herein by reference.

The manufacture of an arrangement according to the invention is preferably carried out in a manner known per se by utilizing microlithography and an ion exchange especially with glass substrates.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
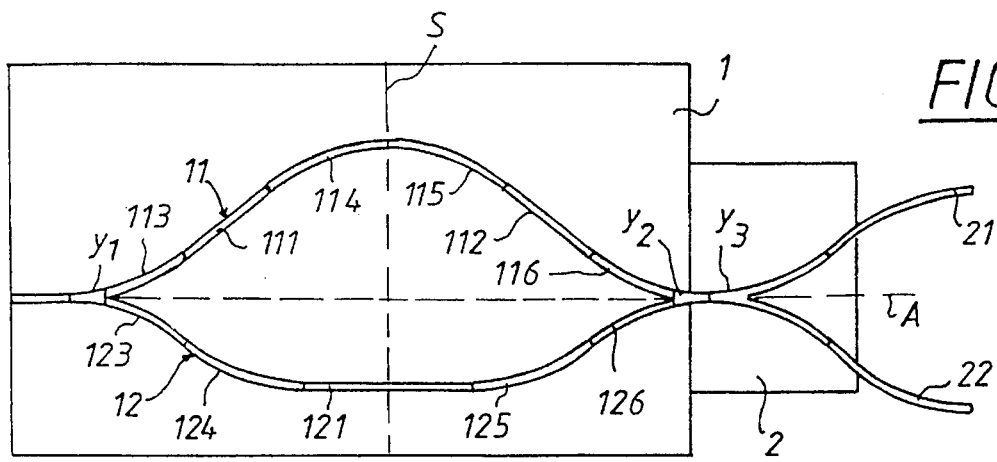
FIG. 1 is a schematic of a Mach-Zehnder demultiplexer having two Y-branches at the output thereof.

The arrangement of FIG. 1 incorporates features corresponding to the duplexer shown in European patent publication 0,482,461 and has an asymmetrical Mach-Zehnder interferometer 1 having a Y-branch $Y_1$ at the input, two arms (11, 12) of different length and two Y-branches ($Y_2$, $Y_3$) in cascade at the output. The two Y-branches ($Y_2$, $Y_3$) conjointly define a cross coupler 2 having two output waveguides (21, 22). The second Y-branch $Y_3$ is asymmetric.

A special feature of the invention is in the configuration of the arms (11, 12). The first arm 11 comprises arcuate segments (113, 114, 115, 116) and two straight segments (111 and 112). The second arm 12 has arcuate segments (123, 124, 125, 126) with each arcuate segment having the same radius and same angle for a corresponding arcuate segment (113, 114, 115, 116) of the first arm 11 so that there is pairwise symmetry. However, in the second arm 12, only one straight segment 121 having the length $L_{121}$ is provided which is parallel to the axis A. The straight segments (111, 112) of the first arm 11 lie, however, inclined to axis A. Their overall lengths $L_{111}+L_{112}$ are therefore greater than the length $L_{121}$:

$$L_{111}+L_{112}=L_{121}+\Delta L.$$

$\Delta L$ is then the total geometric length difference of the asymmetric Mach-Zehnder interferometer.

FIG. 1 shows that the arrangement of the arms (11, 12) is mirror symmetrical to a symmetry axis S perpendicular to the axis A.

Figure 2:
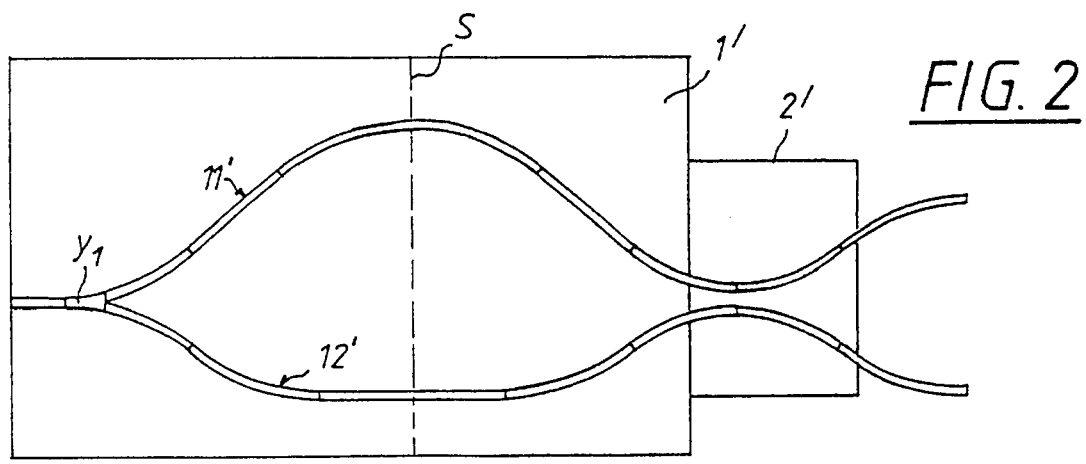
FIG. 2 is a schematic of an embodiment of a Mach-Zehnder demultiplexer having a conventional contactless 2×2 coupler at the output thereof.

FIG. 2 shows an embodiment which includes a contactless 2×2 coupler 2' at the output of the Mach-Zehnder interferometer 1'. The arms (11', 12') are now no longer entirely symmetrical to the plane S in the junction region to the 2×2 coupler 2'.

Figure 3:
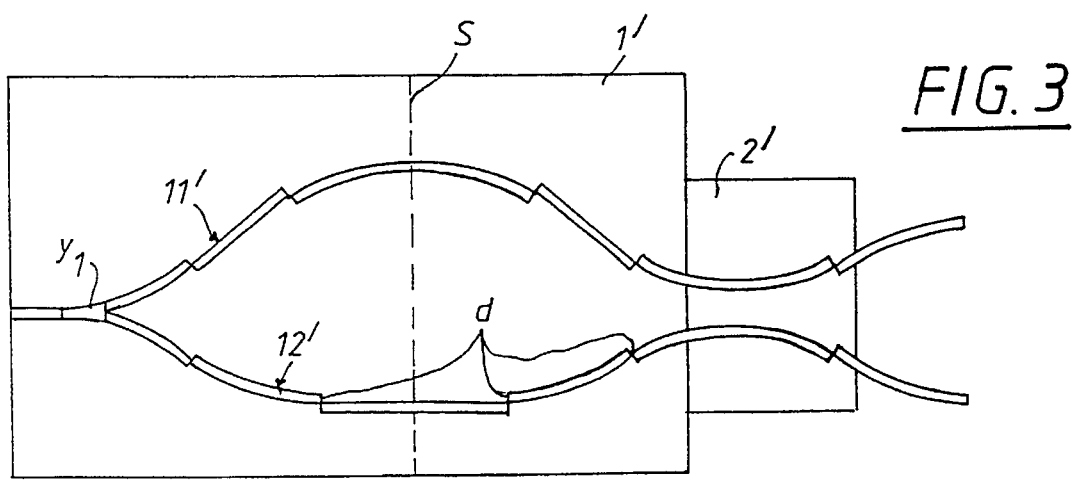
FIG. 3 is a schematic of an arrangement having a lateral offset for reducing losses at the junction locations between segments of different curvature in both arms of the Mach-Zehnder interferometer according to the invention; and, FIG. 4 is a schematic of an embodiment of a Mach-Zehnder demultiplexer having a contactless, asymmetrical 2×2 coupler as described in U.S. Pat. No. 5,526,453, and incorporated herein by reference.

A variation of FIG. 2 is shown in FIG. 3 wherein a lateral offset of the waveguide structure is provided at the junctions between segments of the arms (11', 12') having different curvature. This offset is suitable to reduce attenuation as disclosed in German Patent 3,107,112 and in U.S. patent application Ser. No. 08/441,463, filed May 15, 1995, and incorporated herein by reference. This measure can also be used at selected individual junctions which are especially critical rather than at all locations.

Figure 4:
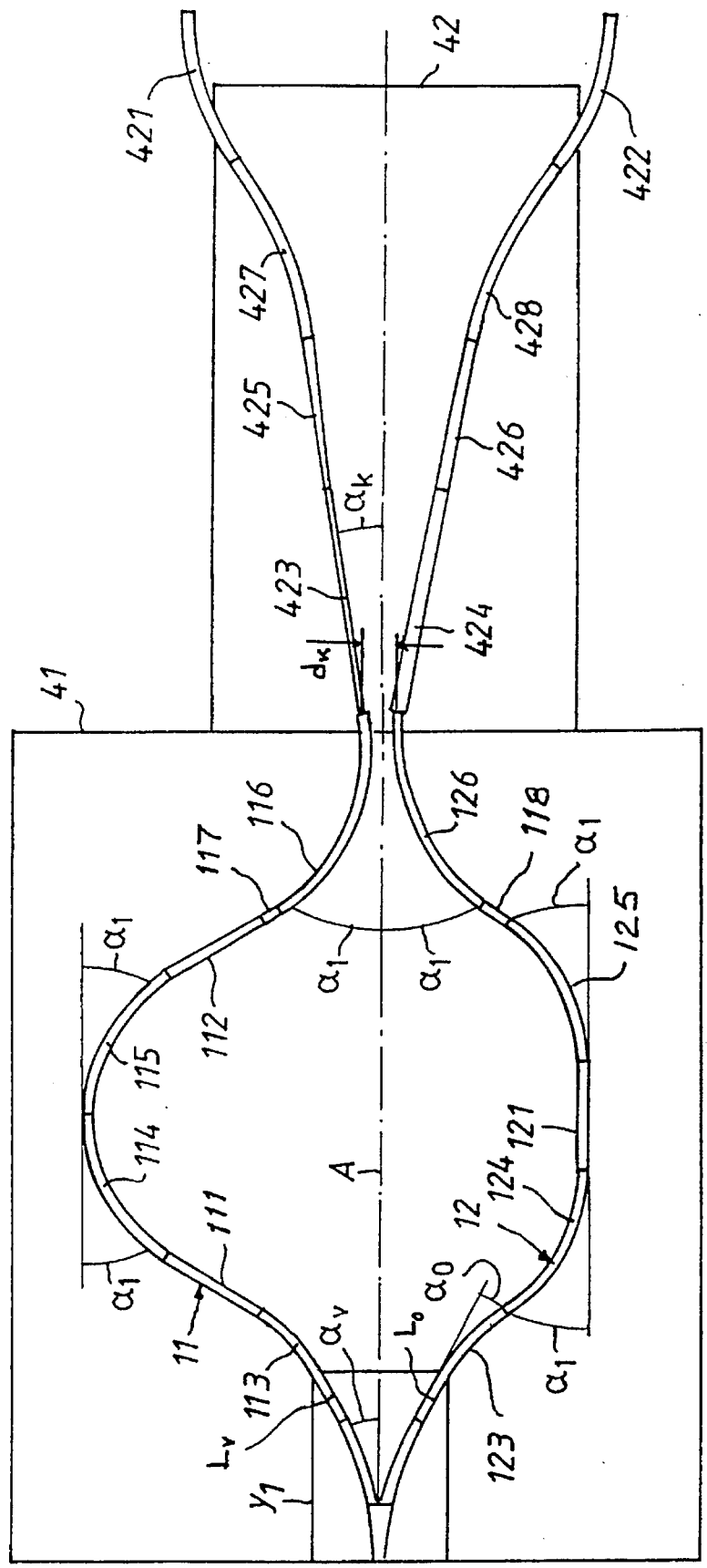

A preferred embodiment having asymmetrical adiabatic waveguides in the contactless 2×2 coupler is shown in FIG. 4 wherein the coupler is identified by reference numeral 42. The waveguides of the coupler diverge and are inclined with respect to axis A. The 2×2 coupler 42 is disclosed in said U.S. Pat. No. 5,526,453, incorporated herein by reference.

The Mach-Zehnder interferometer 41 having the waveguide arms (11, 12) includes at the input a Y-branch $Y_1$ which, in turn, has a branch radius $R_v=100$ mm, a branching angle of $\alpha_v=0.60°$ and linear end segments having a length $L_v=1.0$ mm. The arcuate segments (113, 123) extending therefrom have a radius $R=70$ mm and an arcuate angle $\alpha_0=1.16°$. The additional arcuate segments (114, 115, 116 and 124, 125, 126) are the same with respect to each other and have the same radius R and an arcuate angle $\alpha_1=\alpha_0+\alpha_v=1.76°$.

The straight segment 121 in the second arm 12 has a length of $L_2=6667.695$. The two inclined linear segments (111, 112) conjointly define an equilateral triangle with the linear segment 121. The length $L_1$ of the linear segments (111, 112) is as follows:

$$L_1=L_2/2 \cos \alpha_1=3335.42$$

In this way, the geometric path length of the second arm 12 is shorter by $\Delta L=2 L_1-L_2=3.1$ μm than the length of the first arm 11.

Short linear segments (117, 118) having the length $L_3=6$ μm are inserted into the two arms (11, 12) for adapting to the geometry of the 2×2 coupler 42.

The wavelength segments in the region of the Mach-Zehnder interferometer 41 have a width of $w_0=1.5$ μm and in the coupling region of the 2×2 coupler 42, these waveguide segments abut and extend into waveguide segments 423 and 424 at junctions where waveguide segments are at a spacing $d_K=5$ μm (measured center to center of the waveguides). The straight waveguides 423 and 424 diverge from each other at an angle $\alpha_K=0.1°$ and each waveguide (423, 424) has a length of 7.2 μm. The waveguide 423 has a width $w_1=1.1$ μm and the waveguide 424 has a width $w_2=1.9$ μm.

Thereafter, tapered segments (425, 426) follow with each having a length of $L_t=0.86$ mm. These tapered savants bring the width of the waveguides again to the standard width of $w_0=1.5$ μm.

The following arcuate segments (427, 428 and 421, 422) each have the radius $R_1=90$ mm and the arcuate angle of 2°. Their geometry is determined by the requirement that the outlets of the savants (421, 422) should lie parallel at a spacing of 250 μm with the largest possible radii for minimizing the attenuation and yet have a structural length which can nonetheless be useable. The entire arrangement shown in FIG. 4 has a length of just 32 mm of which 17.2 mm is for the Mach-Zehnder interferometer 41 and 14.2 mm is for the 2×2 coupler 42. The greatest width of the Mach-Zehnder interferometer 41 is approximately 0.2 mm.

This embodiment provides an effective demultiplexer for the two wavelengths $\lambda_1=1.31$ μm and $\lambda_2=1.55$ μm which are widely used in optical communications technology.

Curvature losses are of no consequence with the radii of the arcuate segments shown in the embodiment of FIG. 4. Only when the desired arm length difference becomes greater (which is the case when the wavelengths to be separated lie closer to each other than here) or when a greater integration density on the chip requires a shorter structural length, do the curvature losses become significant.

The phase differences $\Delta\Phi$ for both wavelengths at the outlet of the Mach-Zehnder interferometer 41 are computed from the effective indices and the arm length difference $\Delta L$:

$$\Delta\Phi(\lambda i)=(2\pi/\lambda i)\times n_{\text{eff}}(\lambda i)\times\Delta L. \qquad \text{Equation 1}$$

With respect to the mode guidance, it is more advantageous when the longer wavelength is guided in the wider arm 424 of the 2×2 coupler 42, that is, the longer wavelength is subjected to a constructive interference by the arm length difference $\Delta L$. Accordingly, the following applies with $\lambda_1=1.31$ μm and $\lambda_2=1.55$ μm:

$$\Delta\Phi(\lambda_1)=(2 m_1-1)\times\pi \qquad \text{Equation 2}$$

$$\Delta\Phi(\lambda_2) = (2 m_2) \times \pi \qquad \text{Equation 3}$$

In the above, $m_1$ and $m_2$ are integers which identify numbers of wavelengths of the two light fluxes having wavelengths $\lambda_1$ and $\lambda_2$, respectively. These numbers of wavelengths are accommodated in the geometric wavelength difference $\Delta L$. The solution of the system of equations comprising equations 1, 2 and 3 results in:

$$m_1 = \frac{n_{\mathit{eff}}(\lambda_1) \cdot \lambda_2}{n_{\mathit{eff}}(\lambda_2)\lambda_1} \times m_2 + 0.5 \qquad \text{Equation 4:}$$

For the value $\Delta L=3.1$ μm obtained in the example, an integer solution of equation 4 results with $m_2=3$, $m_1=4$ (in good approximation).

The embodiment shown for a Mach-Zehnder demultiplexer of FIG. 4 has a high tolerance with respect to manufacturing tolerances and environmental parameters.

If polarization double refraction is ensured for the two arms (11, 12), then the arrangement can also be applied as a polarization duplexer for two orthogonal polarization directions.

The arrangement of the invention can also be configured as a sensor or modulator if one or both arms (11, 12) are subjected to influences which operate on the effective refractive index $n_{\mathit{eff}}$. These influences can, for example, be temperature, pressure, adsorbates (chemical sensor) and electric fields. The arrangement as a sensor for electric fields is known for symmetrical Mach-Zehnder interferometers having a 2×2 coupler of the Y-Y type, for example, from U.S. Pat. No. 4,674,827 and for a symmetrical Mach-Zehnder interferometer with a contactless 2×2 coupler, reference can be made to U.S. Pat. No. 5,119,447.

It is understood that the foregoing description is that of the preferred embodiments of the invention and that various changes and modifications may be made thereto without departing from the spirit and scope of the invention as defined in the appended claims.

What is claimed is:

1. An integrated optical Mach-Zehnder interferometer comprising:

first and second waveguide arms;

said first waveguide arm including a first plurality of arcuate segments and a plurality of straight segments;

said second waveguide arm including a second plurality of arcuate segments and at least one straight segment;

each of said arcuate segments of said second plurality being a mirror image of a corresponding one of said arcuate segments of said first plurality of arcuate segments; and, said straight segment of said second waveguide arm having a length less than the total length of said straight segments of said first waveguide arm.

2. The integrated optical Mach-Zehnder interferometer of claim 1, further comprising a carrier; and, said first and second waveguide arms being embedded in said carrier utilizing microlithography and ion exchange.

3. The integrated optical Mach-Zehnder interferometer of claim 1, further comprising an input waveguide connected to said first and second waveguide arms and said input waveguide defining an axis A extending between said first and second waveguide arms; and, said first and second waveguide arms being symmetrical with respect to a plane S extending perpendicularly to said axis A.

4. An integrated optical Mach-Zehnder interferometer comprising:

first and second waveguide arms;

said first waveguide arm including a first plurality of arcuate segments and a plurality of straight segments;

said second waveguide arm including a second plurality of arcuate segments and at least one straight segment;

each of said arcuate segments of said second plurality being a mirror image of a corresponding one of said arcuate segments of said first plurality of arcuate segments;

said straight segment of said second waveguide arm having a length less than the total length of said straight segments of said first waveguide arm; and, two of said arcuate segments of one of said waveguide arms having different curvatures and conjointly defining a junction having a lateral offset (d) for reducing attenuation.

5. An integrated optical Mach-Zehnder interferometer comprising:

first and second waveguide arms;

said first waveguide arm including a first plurality of arcuate segments and a plurality of straight segments;

said second waveguide arm including a second plurality of arcuate segments and at least one straight segment;

each of said arcuate segments of said second plurality being a mirror image of a corresponding one of said arcuate segments of said first plurality of arcuate segments;

said straight segment of said second waveguide arm having a length less than the total length of said straight segments of said first waveguide arm; and, said first waveguide arm having two straight segments and said second waveguide arm having one straight segment.

6. An integrated optical Mach-Zehnder interferometer comprising:

first and second waveguide arms;

said first waveguide arm including a first plurality of arcuate segments and a plurality of straight segments;

said second waveguide arm including a second plurality of arcuate segments and at least one straight segment;

each of said arcuate segments of said second plurality being a mirror image of a corresponding one of said arcuate segments of said first plurality of arcuate segments;

said straight segment of said second waveguide arm having a length less than the total length of said straight segments of said first waveguide arm; and, light of a first wavelength and polarization direction emerges with the same phase after passage through either of said first and second waveguide arms, and light of a second wavelength and polarization direction emerges with opposite phases after passage through either of said first and second waveguide arms.

7. A multiplexer/demultiplexer comprising:

an integrated optical Mach-Zehnder interferometer including: first and second waveguide arms; said first waveguide arm including a first plurality of arcuate segments and a plurality of straight segments; said second waveguide arm including a second plurality of arcuate segments and at least one straight segment; each of said arcuate segments of said second plurality being a mirror image of a corresponding one of said arcuate segments of said first plurality of arcuate segments; and, said straight segment of said second waveguide arm having a length less than the total length of said straight segments of said first waveguide arm;

said first and second waveguide arms defining an output;

a cross coupler having two Y-branches connected in cascade; and, one of said Y-branches being connected to said output.

8. A multiplexer/demultiplexer comprising:

an integrated optical Mach-Zehnder interferometer including: first and second waveguide arms; said first waveguide arm including a first plurality of arcuate segments and a plurality of straight segments; said second waveguide arm including a second plurality of arcuate segments and at least one straight segment; each of said arcuate segments of said second plurality being a mirror image of a corresponding one of said arcuate segments of said first plurality of arcuate segments; and, said straight segment of said second waveguide arm having a length less than the total length of said straight segments of said first waveguide arm;

said first and second waveguide arms defining an output;

a cross coupler having two Y-branches connected in cascade;

one of said Y-branches being connected to said output; and, said first waveguide arm having two straight segments and said second waveguide arm having one straight segment.

9. A multiplexer/demultiplexer comprising:

an integrated optical Mach-Zehnder interferometer including: first and second waveguide arms; said first waveguide arm including a first plurality of arcuate segments and a plurality of straight segments; said second waveguide arm including a second plurality of arcuate segments and at least one straight segment; each of said arcuate segments of said second plurality being a mirror image of a corresponding one of said arcuate segments of said first plurality of arcuate segments; and, said straight segment of said second waveguide arm having a length less than the total length of said straight segments of said first waveguide arm;

said first and second waveguide arms defining an output; and, a contactless (2×2) coupler connected to said output.

10. The multiplexer/demultiplexer of claim 9, said contactless (2×2) coupler being asymmetrical.

11. A multiplexer/demultiplexer comprising:

an integrated optical Mach-Zehnder interferometer including: first and second waveguide arms; said first waveguide arm including a first plurality of arcuate segments and a plurality of straight segments; said second waveguide arm including a second plurality of arcuate segments and at least one straight segment; each of said arcuate segments of said second plurality being a mirror image of a corresponding one of said arcuate segments of said first plurality of arcuate segments; and, said straight segment of said second waveguide arm having a length less than the total length of said straight segments of said first waveguide arm;

said first and second waveguide arms defining an output;

a contactless (2×2) coupler connected to said output;

said contactless (2×2) coupler being asymmetrical;

one of said arcuate segments of said first waveguide arm being an end segment thereof and defining a first end face;

one of said arcuate segments of said second waveguide arm being an end segment thereof and defining a second end face;

said first and second end faces conjointly defining said output;

said end segments being symmetrical with respect to each other and having the same propagation constant;

said contactless (2×2) coupler having two adiabatic waveguide segments abutting corresponding ones of said end faces;

said waveguide segments having respective propagation constants different from each other; and, said waveguide segments being arranged so as to diverge away from each other.

* * * * *

UNITED STATES PATENT AND TRADEMARK OFFICE
CERTIFICATE OF CORRECTION

PATENT NO. : 5,611,007
DATED : March 11, 1997
INVENTOR(S) : Barbara Wolf and Norbert Fabricius It is certified that error appears in the above-identified patent and that said Letters Patent is hereby corrected as shown below:

On the title page, item [73] Assignee: delete "Optil" and substitute -- Optik -- therefore.

In column 4, line 24: delete "7.2 µm" and substitute -- 7.2 mm -- therefor.

In column 4, line 29: delete "savants" and substitute -- segments -- therefor.

In column 4, line 35: delete "savants" and substitute -- segments -- therefor.

Signed and Sealed this

Thirteenth Day of May, 1997

*Attest:*

BRUCE LEHMAN

*Attesting Officer*   *Commissioner of Patents and Trademarks*